Patented Sept. 1, 1936

2,052,590

UNITED STATES PATENT OFFICE 2,052,590

METHOD OF MAKING FILAMENTS, FILMS, AND THE LIKE

William Whitehead, Cumberland, Md., assignor to Celanese Corporation of America, a corporation of Delaware No Drawing. Application July 20, 1932,
Serial No. 623,607

6 Claims. (Cl. 18—54)

This invention relates to the preparation of artificial products and relates more particularly to the manufacture of textile materials, films and other products containing organic derivatives of cellulose.

An object of my invention is to prepare yarns, filaments and other products containing organic derivatives of cellulose which have a subdued lustre or which are capable of having a subdued lustre imparted thereto.

Often it is desired to prepare filaments, yarns and like products which have a subdued lustre. For this purpose it has been proposed to incorporate finely divided water-insoluble pigment-like material in the spinning solutions from which the filaments are formed. However this involves the introduction of a foreign material into such filaments, which for some purposes it is desirable to avoid. Moreover the grinding of such pigments to the required fine particle size is a tedious and prolonged process.

I have found that if a finely divided water-soluble salt or substance that is not soluble in the solvent of the solution is incorporated in a solution of a derivative of cellulose, the filaments, films or other products made therefrom are capable of being readily delustered by the removal of such salts by treatment with water or other solvent for the same. Instead of removing such salts, the products containing them may be treated with a solution of a substance which is capable of forming an insoluble compound with the salt or substance in such products.

In accordance with my invention, I prepare artificial products containing derivatives of cellulose by incorporating in a solution of a derivative of cellulose a finely divided water-soluble substance which is not soluble or only slightly soluble in the solvent of such solution, and then forming desired products therefrom. The products so formed may be treated with an aqueous liquid or other material for removing at least part of such water-soluble finely divided substance, whereby the subdued lustre is imparted to the same, or the products may be treated with a material adapted to react with such finely divided substance to form a precipitate within the same. The solutions thus formed may be formed into articles such as filaments, yarns, artificial bristles or straws, photographic films, foils and the like.

Any suitable derivative of cellulose may be employed such as organic esters of cellulose and cellulose ethers. Examples of organic esters of cellulose are cellulose acetate, cellulose formate, cellulose propionate and cellulose butyrate while examples of cellulose ethers are ethyl cellulose, methyl cellulose and benzyl cellulose.

The organic derivative of cellulose is dissolved in a suitable solvent or solvent mixture such as acetone, mixtures of ethylene dichloride and ethyl or methyl alcohol, mixtures of methylene chloride and ethyl or methyl alcohol, etc. If desired other and higher boiling solvents such as ethyl lactate, diacetone alcohol, etc. may also be added to the solution, and in some cases plasticizers such as dibutyl tartrate or diethyl phthalate may be added to the solution.

Any suitable salt or substance that is soluble in water may be incorporated in finely divided form in the solution of the derivative of cellulose, provided it is insoluble or only very slightly soluble in the solvent of such solution. If a substance that is soluble in such solvent is employed, such substance will not form in discrete and widely disseminated fine particles in the filaments or yarns, as is desired. Even substances which are slightly soluble in the solvent are less advantageous, since their particles tend to agglomerate in the solution containing such solvent. Examples of suitable substances that may be employed in the case of solutions of derivatives of cellulose containing acetone as the solvent are anhydrous sodium sulfate, sodium bicarbonate and sodium chloride, which are substantially insoluble, when anhydrous, in pure acetone or in acetone containing 5% of water. Examples of substances which are very slightly soluble in acetone or acetone containing 5% of water are sodium thiosulfate, sodium citrate, aluminum citrate, Rochelle salt (potassium sodium tartrate), sodium borate, basic aluminum acetate, sodium pyrophosphate and copper sulfate, particularly when these salts are anhydrous.

Generally the amount of such salt added is from 0.1 to 10% of the weight of the cellulose compound present in the finished yarn. The salt is preferably in very fine form, the particles having a diameter of less than 0.1 to 5 microns and preferably less than 1 or 2 microns for increased covering power. This fine size may be attained by grinding the salt either with the solvent or part of the spinning solution used in the spinning solution in a ball mill or colloid mill. The ground material is then added to the solution of the derivative of cellulose and to which may also be added diethylene glycol, heavy white mineral oil, olive oil, castor oil or other oils. The spinning solution containing the salt is then preferably thoroughly mixed and subjected to the usual filtration before spinning. However the addition of the salt to the spinning dope at any stage of the filtration process or even after completion of filtration is not excluded.

Filaments or yarns may be made by extruding the solution of the derivative of cellulose containing the finely divided salt through fine orifices into an evaporative atmosphere, as in dry spinning, or into a precipitating bath as in wet spinning. Such filaments or yarns have substantially the same lustre as those formed from similar solutions not containing the finely divided salt.

In one form of my invention, in order to impart a subdued lustre to the filaments, yarns or other products containing the finely divided salt, they are treated with a substance such as water or aqueous liquid adapted to remove or dissolve out the finely divided particles of salt. Treatment with water or aqueous liquid at ordinary temperatures is sufficient for this purpose although the action is more rapid at higher temperatures. This treatment with aqueous liquids to remove the salt may be accomplished during dyeing, scouring or other finishing treatment of the yarns, fabrics or articles made from such solutions.

The removal of the finely divided salt or other water-soluble substance from the filaments, yarns or other artificial materials leaves minute holes or pores in the same which imparts to it a beautiful subdued lustre. Even when fabrics, yarns, etc. made in this manner are dyed in black or dark shades, the subdued lustre persists.

Yarns or fabrics made of cellulose acetate or other organic ester of cellulose containing the finely divided salt when treated with alkaline solutions to saponify the same partially or wholly, have imparted a subdued lustre which is relatively permanent even when ironed while damp.

In another form of my invention, the yarns, filaments or other products containing the finely divided salt may be treated with a substance adapted to react with such salt to form an insoluble finely divided product. Thus filaments or yarns having a finely divided water-soluble sulfate or carbonate incorporated therein may be treated with an aqueous solution of barium chloride which may or may not contain the swelling agent such as thiocyanates, whereupon finely divided barium sulfate is formed within and throughout such filaments or yarns.

In order further to illustrate my invention but without being limited thereto, the following specific examples are given.

*Example I*

Anhydrous sulfate is ground in a ball mill with a 5% solution of acetone-soluble cellulose acetate in acetone until the particle size has been reduced to less than 1 micron. This dispersion is added to a solution containing 1 part by weight of cellulose acetate and 3 parts by weight of acetone, the amount of sodium sulfate added being from 1 to 2% of the weight of the cellulose acetate. The mass is thoroughly mixed and then filtered. The filtered solution is then extruded through the orifices of a spinneret into a drying evaporative atmosphere and the filaments are drawn off and twisted together to form yarn which is wound.

The yarn so formed either as such or in the form of knitted or woven fabric or garments such as hose is then treated with an aqueous liquid, which may be a scouring bath or dyeing bath, at temperatures from 25° up to 100° C. until the desired degree of subdued lustre is imparted thereto.

*Example II*

Yarn spun exactly as described in Example I is treated with an aqueous bath containing a dilute solution of barium chloride or barium thiocyanate for 1 hour at 25 to 65° C. Barium sulfate is formed within and throughout the filaments in particle size of less than 1 micron. The yarns are well delustered by this treatment and the subdued lustre is permanent.

It is to be understood that the foregoing detailed description is given merely by way of illustration and many variations may be made therein without departing from the spirit of my invention.

Having described my invention, what I desire to secure by Letters Patent is:

1. Method of forming artificial yarns or filaments of subdued lustre which comprises incorporating in a solution of an organic derivative of cellulose in an organic solvent a finely divided water-soluble substance substantially insoluble in said solvent, extruding said solution and treating the products with an aqueous solution of an agent adapted to react with said substance to form a water-insoluble compound.

2. Method of forming artificial yarns or filaments of subdued lustre which comprises incorporating in a solution of cellulose acetate in an organic solvent a finely divided water-soluble salt substantially insoluble in said solvent, extruding said solution and treating the products with an aqueous solution of an agent adapted to react with said salt to form a water-insoluble compound.

3. Method of forming artificial yarns or filaments of subdued lustre, which comprises incorporating in a solution of an organic derivative of cellulose in an organic solvent a finely divided water-soluble sulfate substantially insoluble in said solvent, extruding said solution to form yarns or filaments and treating the products with an agent adapted to react with said sulfate to form a water-insoluble compound.

4. Method of forming artificial yarns or filaments of subdued lustre, which comprises incorporating in a solution of cellulose acetate in an organic solvent a finely divided water-soluble sulfate substantially insoluble in said solvent, extruding said solution to form yarns or filaments and treating the extruded products with a barium salt adapted to react with said sulfate to form barium sulfate.

5. Method of forming artificial yarns or filaments of subdued lustre, which comprises incorporating in a solution of an organic derivative of cellulose in an organic solvent a finely divided sodium sulfate substantially insoluble in said solvent, extruding said solution to form yarns or filaments and treating the extruded products with barium chloride adapted to react with said sulfate to form barium sulfate.

6. Method of forming artificial yarns or filaments of subdued lustre, which comprises incorporating in a solution of cellulose acetate in an organic solvent a finely divided anhydrous sodium sulfate substantially insoluble in said solvent, extruding said solution to form yarns or filaments and treating the extruded products with barium chloride adapted to react with said sulfate to form barium sulfate.

WILLIAM WHITEHEAD.